US008350884B2

(12) United States Patent
Ito et al.

(10) Patent No.: US 8,350,884 B2
(45) Date of Patent: Jan. 8, 2013

(54) IMAGE FORMING METHOD, OPTICAL SCANNING APPARATUS AND IMAGE FORMING APPARATUS

(75) Inventors: Shinjiro Ito, Hachioji (JP); Kazunori Ishige, Tachikawa (JP); Toru Makino, Tachikawa (JP)

(73) Assignee: Konica Minolta Business Technologies, Inc. (JP)

( * ) Notice: Subject to any disclaimer, the term of this patent is extended or adjusted under 35 U.S.C. 154(b) by 323 days.

(21) Appl. No.: 12/582,482

(22) Filed: Oct. 20, 2009

(65) Prior Publication Data
US 2010/0104304 A1    Apr. 29, 2010

(30) Foreign Application Priority Data

Oct. 23, 2008  (JP) .................................. 2008-273478

(51) Int. Cl.
B41J 2/47  (2006.01)
(52) U.S. Cl. ...................................................... 347/252
(58) Field of Classification Search .................. 347/133, 347/135, 116, 143–144, 236–237, 241, 246–247, 347/251–254
See application file for complete search history.

(56) References Cited

U.S. PATENT DOCUMENTS

| 4,768,043 | A | | 8/1988 | Saito et al. |
| 5,144,337 | A | | 9/1992 | Imamura et al. |
| 5,296,877 | A | * | 3/1994 | Sato .............................. 347/115 |
| 5,561,743 | A | * | 10/1996 | Kanai et al. ..................... 358/1.7 |
| 6,833,926 | B1 | | 12/2004 | Takano et al. |
| 2008/0170283 | A1 | | 7/2008 | Imai |

FOREIGN PATENT DOCUMENTS

| GB | 2153182 A | 8/1985 |
| JP | 05-138946 A | 6/1993 |
| JP | 07-281114 A | 10/1995 |
| JP | 09-069944 A | 3/1997 |
| JP | 09-193474 A | 7/1997 |
| JP | 2000-190554 A | 7/2000 |
| JP | 2001-056443 A | 2/2001 |
| JP | 2002-67376 A | 3/2002 |

OTHER PUBLICATIONS

European Search Report for European Application No. 10175718.5-2202 dated Oct. 21, 2010.
European Search Report for Application No./Patent No. 09173224.8-2202 dated Mar. 3, 2010.
European Search Report for Application No./Patent No. 09173224.8-2202 dated Dec. 21, 2009.
Japanese Office Action, Notice of Reasons for Refusal for Japanese patent application No. 2008-273478, mailing date of Oct. 31, 2012 with English translation.

* cited by examiner

*Primary Examiner* — Hai C Pham
(74) *Attorney, Agent, or Firm* — Cantor Colburn LLP

(57) ABSTRACT

An image forming method including: inputting a pulse width modulated signal into a laser beam output section and thereby outputting a laser beam, wherein a pulse width of the pulse width modulated signal is changed based on image data containing density information; scanning the laser beam onto a surface of a photoreceptor through an optical scanning apparatus and thereby outputting an image; detecting a diameter of the laser beam in a sub-scanning direction formed on the surface of the photoreceptor, the diameter of the laser beam inherent to each optical scanning apparatus and changing along an image height in a main scanning direction; and correcting the pulse width in response to the diameter in the sub-scanning direction so that the image output density is uniform with respect to one and the same input density in the image data.

12 Claims, 13 Drawing Sheets

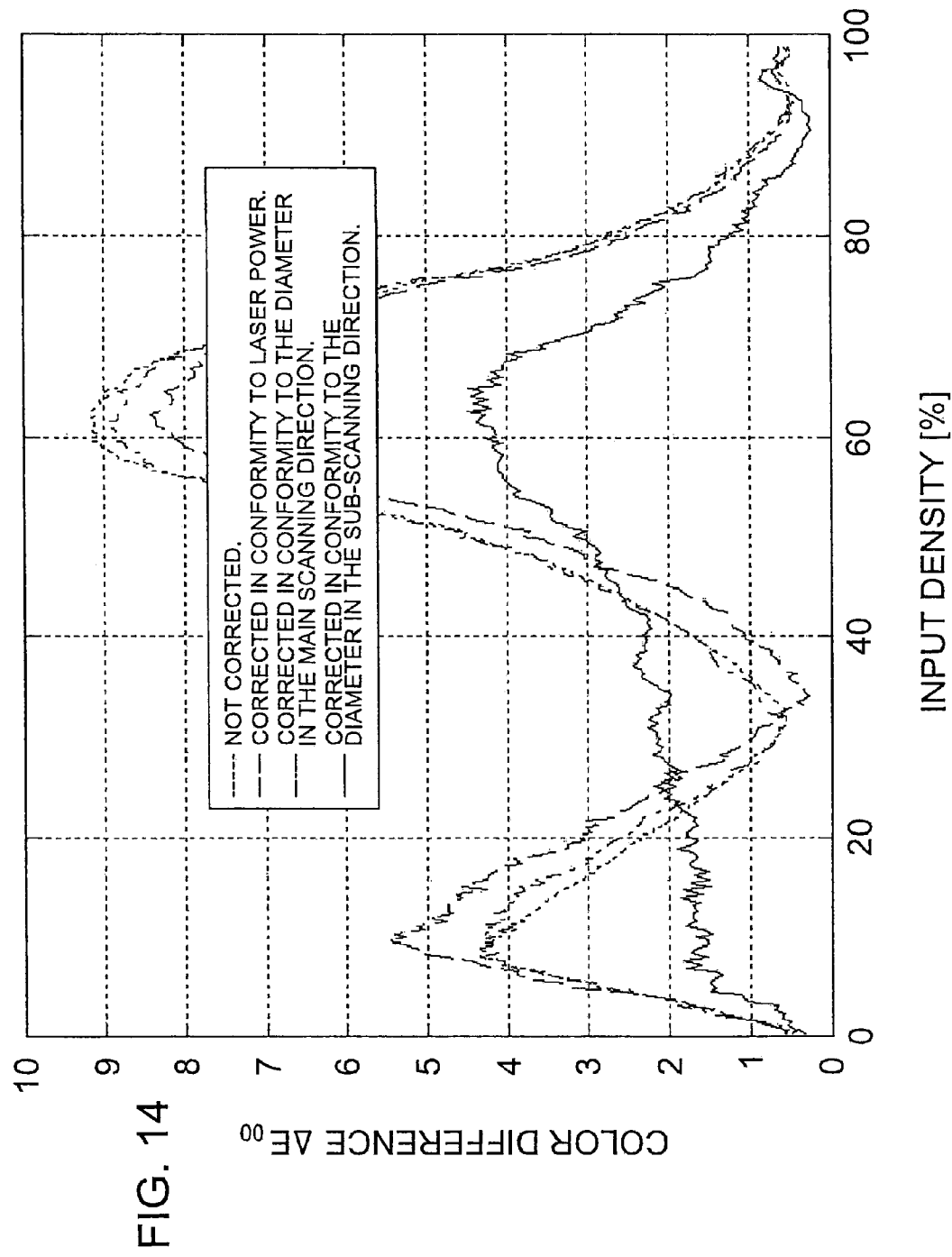

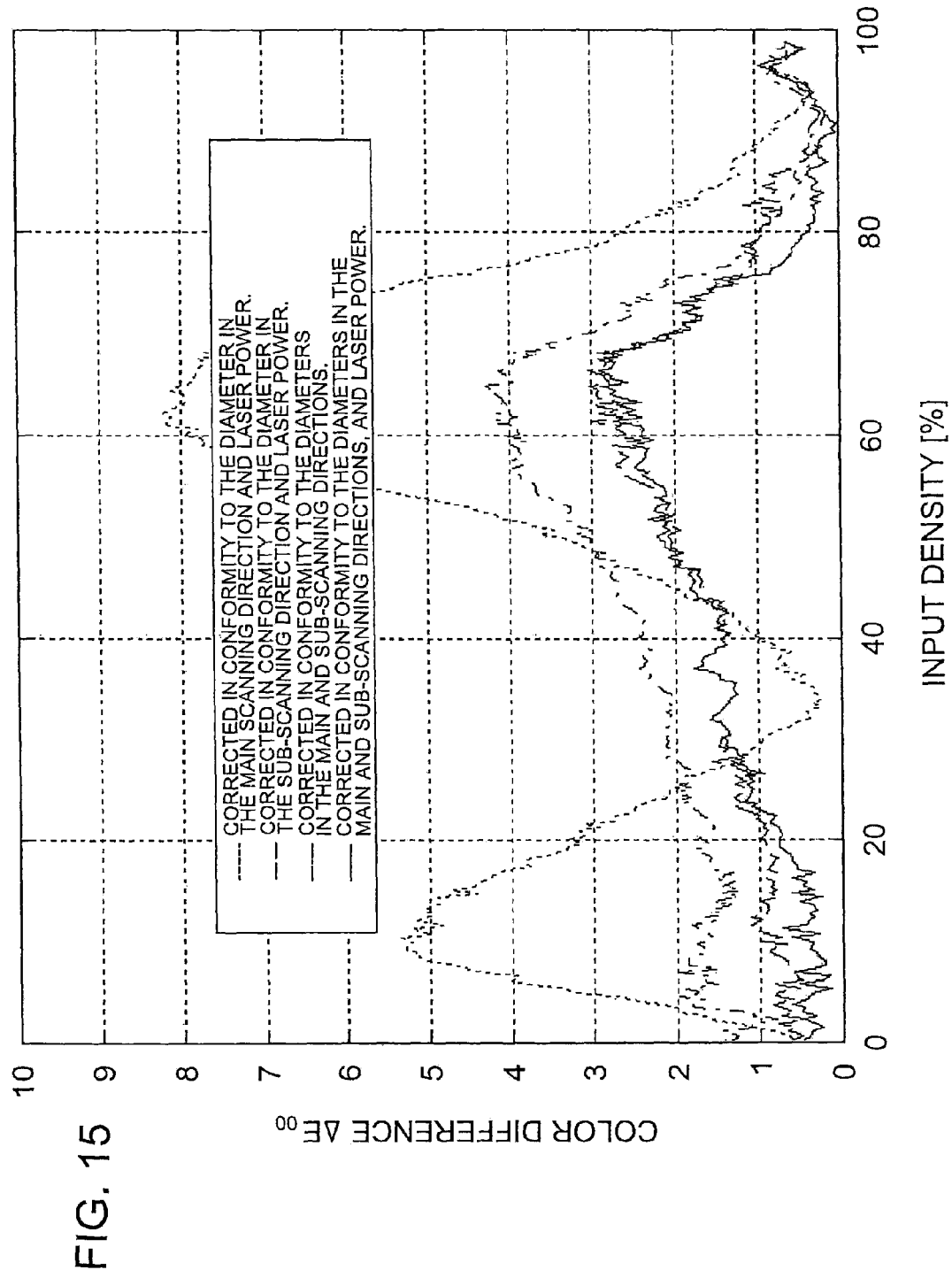

IMAGE FORMING METHOD, OPTICAL SCANNING APPARATUS AND IMAGE FORMING APPARATUS

CROSS REFERENCE TO RELATED APPLICATION

The present application is based on the Japanese Patent Application Number 2008-273478 filed on Oct. 23, 2008 in the Japanese Patent Office, the entire content of which is hereby incorporated by reference.

BACKGROUND OF THE INVENTION

1. Field of Technology

The present invention relates to an image forming method, optical scanning apparatus and image forming apparatus wherein a laser beam is applied onto a photoreceptor to perform scanning and exposure operations according to image data by means of an optical scanning apparatus, whereby an image is formed.

2. Description of Related Art

In an image forming apparatus of a printing press, photocopier, printer, facsimile, and MFP (multi-functional peripheral) made up of a combination of these devices, a pulse width modulated signal having a modulated pulse width is generated according to the image data containing density information. This signal is inputted into the laser beam generating section (e.g., LD) as a drive signal. The laser beam coming out of the laser beam generating section is applied onto a photoreceptor to perform scanning and exposure operations by an optical scanning apparatus so that a latent image is formed on the photoreceptor. After that, the latent image is developed by a developer and is fixed onto a sheet of paper, whereby the image forming operation is performed.

Generally, the laser beam having passed through a cylindrical lens is deflected in the main scanning direction by a rotating polygon mirror, whereby the aforementioned optical scanning apparatus performs a scanning operation. An fθ lens is arranged between the polygon mirror and photoreceptor, and the deflected laser beam is converged onto a flat image surface, whereby a scanning operation is performed at a uniform speed.

Incidentally, in the aforementioned image forming apparatus, it is difficult to ensure the uniform position in the main scanning direction (image height) and uniform diameter of the laser beam formed on the photoreceptor in the main scanning direction, partly because the laser beam scanning operation is performed in the main scanning direction. Thus, the fluctuation thereof and the fluctuation in the output power of the laser beam are known to cause irregularity in the density of the output image.

One of the methods proposed to solve this problem is a feedback control technique for detecting the output power of the laser beam and feeding the same back to the output at the laser output section (Japanese Unexamined Patent Application Publication No. 2002-67376). This technique, however, fails to prevent the irregularity in density from being caused by the fluctuation in the diameter of the laser beam in the main scanning direction.

In an image forming apparatus having been proposed, a sensor for detecting the beam diameter is mounted on the photoreceptor, and an appropriate pulse width is selected so as to ensure exposure energies in the main scanning direction will be the same in response to a plurality of different positions in the main scanning direction (a plurality of different image heights) and the beam diameter in the main scanning direction, whereby the irregularity in density is prevented. In the selection of the appropriate pulse width, a table is stored to show the appropriate pulse width to be used in response to the number of beam diameters, if a plurality of beam diameters is present in the main scanning direction (see the description of the Embodiments and others in Japanese Unexamined Patent Application Publication No. 2000-190554).

In a study made by the present inventors, however, it has been found out that, in addition to the fluctuation in the diameter of the laser beam in the main scanning direction resulting from the laser scanning operations in the main scanning direction, the fluctuations in the diameter of the laser beam in the sub-scanning direction is caused by the geometric precision of the cylindrical lens and fθ lens from the laser beam output section to the photoreceptor. This is known to affect the irregularity in the density of the output image. It has also been found out that the latter fluctuation tends to be greater than the former fluctuation. This finding is the result of the aforementioned study made by the present inventors wherein, in the laser beam scanning operation, the fluctuation in the diameter of the laser beam in the main scanning direction was observed separately from the fluctuation in the diameter of the laser beam in the sub-scanning direction. Especially when a plastic lens is used as the fθ lens, the fluctuation in the sub-scanning direction is sometimes several times greater than that in the main scanning direction, for example. The magnitude of the beam diameter in the sub-scanning direction as described above has a more serious impact on the irregularity in density. The proposed aforementioned techniques have failed to sufficiently avoid the irregularity in density.

The present invention has been made to solve the prior art problems described above. To ensure uniform output image density, the primary step to be taken is to consider the problem from the viewpoint of fluctuations in the sub-scanning direction. This attitude has led to the completion of the present invention.

SUMMARY OF THE INVENTION

One aspect of the present invention is an image forming method having inputting a pulse width modulated signal into a laser beam output section for outputting a laser beam, wherein a pulse width of the pulse width modulated signal is changed based on image data containing density information; scanning the laser beam onto a surface of a photoreceptor through an optical scanning apparatus for forming an image; detecting a diameter of the laser beam in a sub-scanning direction formed on the surface of the photoreceptor, the diameter of the laser beam inherent to each optical scanning apparatus and changing along an image height in a main scanning direction; and correcting the pulse width in response to the diameter in the sub-scanning direction so that the image output density is uniform with respect to one and the same input density in the image data.

Another aspect of the present invention is a photo scanning apparatus which scans a laser beam on a surface of a photoreceptor, the laser beam outputted from a laser beam output section by a pulse width modulated signal, wherein a pulse width of the pulse width modulated signal is changed based on image data containing density information, and is detachably mounted on a main body of an image forming apparatus, the photo scanning apparatus comprising a laser scanning apparatus memory section which stores, in advance, data relating to an appropriate pulse width making an image output density uniform with respect to one and the same input density of the image data by a combination of an image height in the main scanning direction and an input density of the image data.

And another aspect of the present invention is an image forming apparatus comprising: a laser beam output section which outputs laser beam in response to a pulse width modulating signal, wherein a pulse width of the pulse width is changed based on image data including density information; a photoreceptor on which the laser beam is irradiated; an optical scanning apparatus which scans the laser beam outputted from the laser beam output section onto the photoreceptor; a memory section which memorizes data relating to an appropriate pulse width which makes an image output density uniform with respect to one and the same input density based on a combination of an image height in the main scanning direction and an input density in the image data, for the optical scanning apparatus; and a control section which, when the image is formed, reads out the data relating to the appropriate pulse width for the image height in the main scanning direction and the input density of the image data, and performs a control which executes the laser beam output section to output the laser beam by generating the pulse width modulating signal according to the data.

BRIEF DESCRIPTION OF THE DRAWINGS

FIG. 14 is a diagram showing the relationship between the input density and color difference made in various forms of correction in the example of the present invention; and FIG. 15 is also a diagram showing the relationship between the input density and color difference made in various forms of correction.

Figure 1:
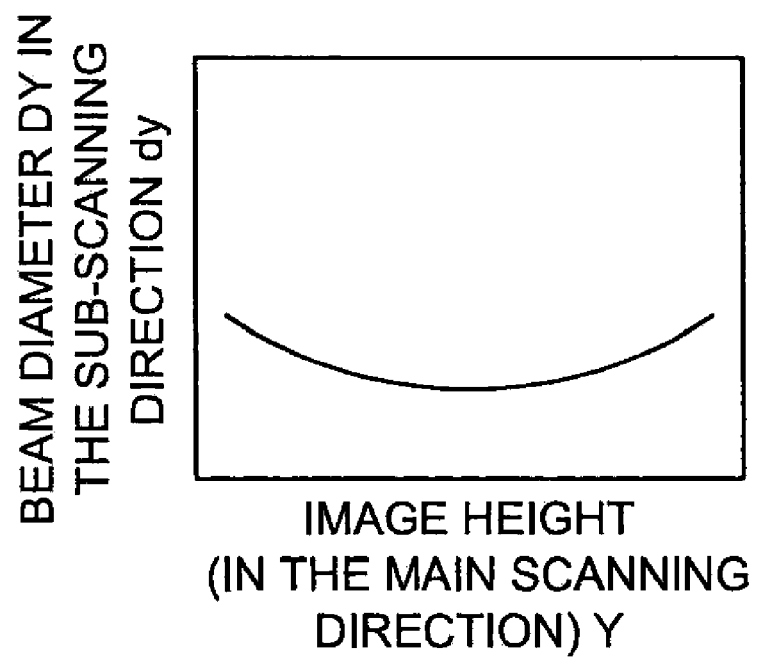
FIG. 1 is a chart representing the relationship between the image height and the diameter of the laser beam in the sub-scanning direction at the time of image formation.

DETAILED DESCRIPTION OF THE PREFERRED EMBODIMENTS (Embodiment 1)

The following describes an embodiment of the image forming method in the present invention.

In the step of correcting the pulse width for the purpose of reducing the irregularity in density mainly caused by the fluctuation in the diameter of the laser beam in the sub-scanning direction along the image height, it is necessary to keep track of the diameter of the laser beam in the sub-scanning direction along the image height and the fluctuation in the density of the output image when the laser power is changed. When an analysis program is used to keep track of the aforementioned data, the approximate scope of the beam diameter "dy" in the sub-scanning direction that can be measured by an actual device and the approximate possible scope of the laser power P are examined, and "n" representative points are determined from among each of these scopes. A combination of beam diameter and power, $(dy^{(i)}, p^{(j)})$ (i, j=1, . . . , n), is subjected to analysis. This analysis reveals $n^2$ gray levels, which are given as the data shown in FIG. 2a. Once the gray level of the beam diameter and power is known, the changes in pulse width can be provided so as to get an ideal gradation. This is referred to as the corrected pulse width. Use of the corrected pulse width improves the gray level as compared to the case of using the pulse width in the original stage, with the result that the irregularity in density is reduced.

The $n^2$ gray levels revealed by the aforementioned analysis are far from the desired ones due to the fluctuation in beam diameter or laser power, and is the direct factor causing the density irregularities in the main scanning direction. To ensure that each gray level agrees with the ideal target gray level shown in FIG. 2c, the way of correcting the pulse width determining the gray level is modified. It is only required to find out the function $f_{ij}$ corresponding to a combination of beam diameter and power $(dy^{(i)}, p^{(j)})$ wherein there is a difference in the way of correcting the pulse width for each combination of the beam diameter and power in the sub-scanning direction, although the targeted gray level is the same. In this case, the function $f_{ij}$ for determining the correction method is the function for mapping the input density onto the pulse width. The analysis program can be used to make sure whether or not use of that function can improve the gray level. The pulse width shown by the solid line of FIG. 2b is corrected by $f_{ij}$. If a correction is not made for the same input density, use of a different appropriate pulse width improves the gray level, with the result that the irregularity in density is reduced.

The aforementioned correction can be performed by detecting the diameter of the laser beam in the sub-scanning direction at the time of forming an image. However, the amount of the aforementioned correction should be obtained, preferably before an image is formed, more preferably at a process before the optical scanning apparatus is mounted on the image forming apparatus.

The image forming apparatus includes a color image forming apparatus as well as the black-and-white image forming apparatus. In the color image forming apparatus, the pulse width is preferably corrected for each color. The following describes the method of obtaining the amount of this correction in a process of providing an optical scanning apparatus.

Figure 4A:
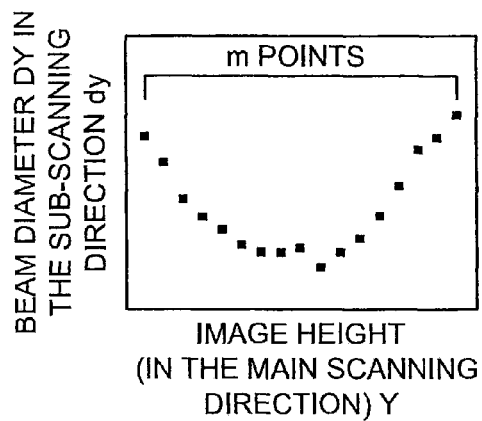
FIGS. 4a, 4b and 4c are diagrams outlining an embodiment of the image forming method in the present invention.
Figure 4B:
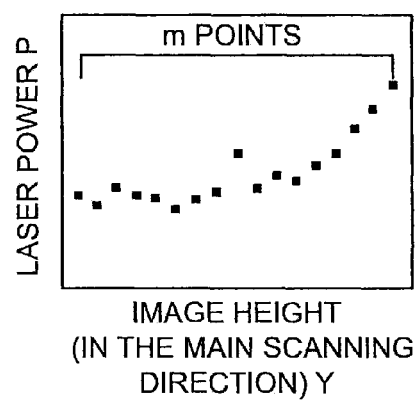
Figure 4C:
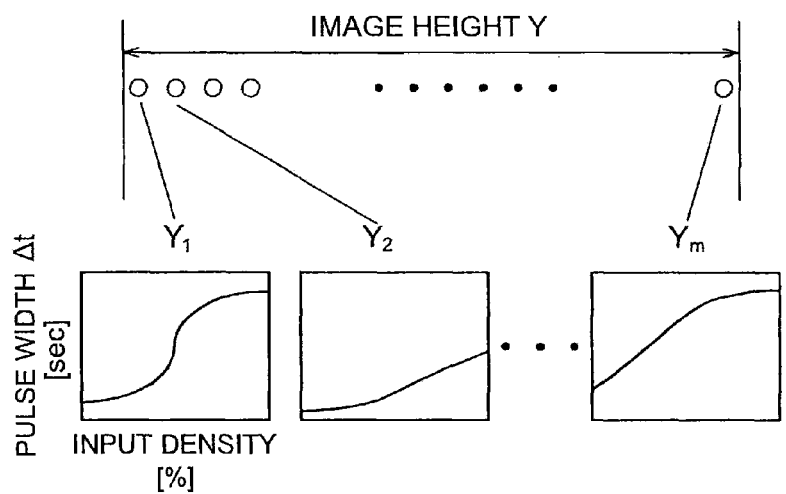
Figure 5:
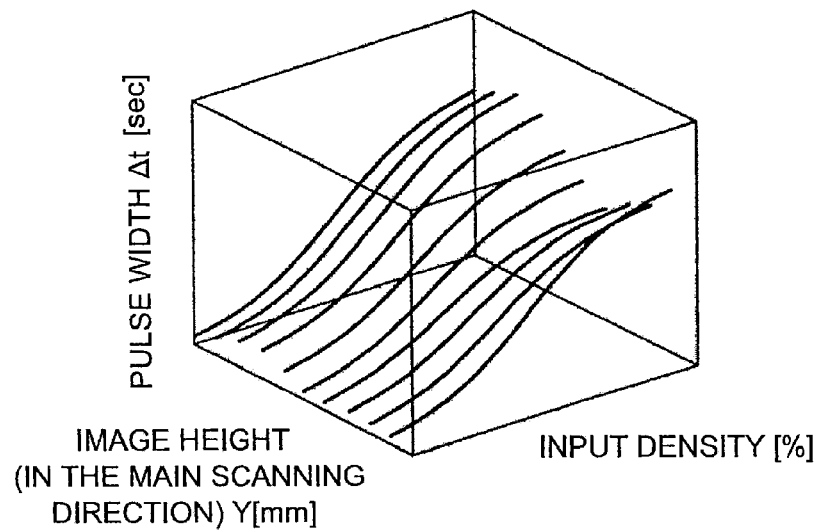
FIG. 5 is a diagram showing the correction information.

For each of the four optical scanning apparatuses corresponding to the colors of cyan, magenta, yellow and black, the beam diameter and power are measured at "m" points along the image height in the main scanning direction, as shown in FIGS. 4a and 4b. This measurement is preferably performed at a sufficiently great number of positions. Prior to measurement, $n^2$ types of analysis are made. Reference should be made to the function $f_{ij}$ corresponding to the combination closest to the combination of the beam diameter and power having been measured in the process. One optical scanning apparatus contains "m" measuring points. This allows "m" functions to be prepared for all the image heights, and provides information on how to correct the pulse width for each image height (FIG. 4c). Measurements should be performed at a sufficiently great number of positions. It goes without saying that the number of positions is limited, and therefore, this alone is not sufficient to define a guideline on what sort of pulse width modulation should be used between two measuring points. Thus, two-dimensional interpolation is performed based on "m" corrected pulse widths corresponding to "m" measuring points (FIG. 5) to obtain the curved surface represented in FIG. 6. Thus, one optical scanning apparatus contains one curved surface for pulse width correction. The color image forming apparatus contains four optical scanning apparatuses for cyan, magenta, yellow and black. Thus, four curved surfaces are provided for one image forming apparatus. Once a interpolated curved surface has been defined, the pulse width to be used for a desired image height and input density can be calculated on a continuous basis. Accordingly, at the time of image formation, the information on the appropriate pulse width can be obtained directly from the aforementioned correction information based on the information on image height and input density. A laser beam can be outputted by the pulse width modulated signal having been modulated to this pulse width, whereby a satisfactory image can be formed.

Figure 7:
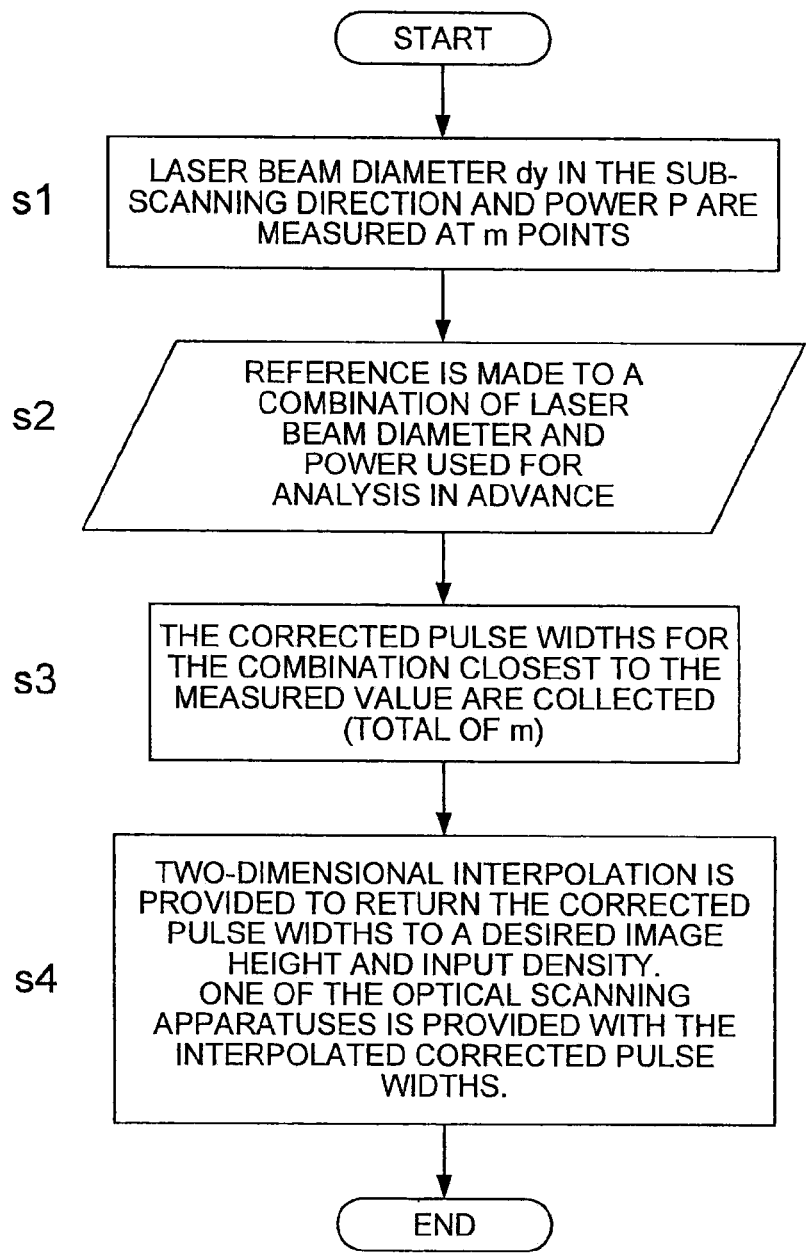
FIG. 7 is a flow chart showing the procedure of getting the correction information.

The following describes the procedure of obtaining the aforementioned correction information with reference to the flow chart of FIG. 7. It is possible to use the simulation technique for predicting the gray level—for predicting how the density D will be changed with the input density, from the laser power P, and "dx" and "dy" of the laser beam in the main and sub-scanning directions. A simulation is performed in advance, and the pulse width is corrected by referencing the corresponding simulation result, from the following amounts having been measured in the process:

the diameter of laser beam in the sub-scanning direction, or
a combination of the diameter of laser beam in the sub-scanning scanning direction, and one or both of the power and diameter of the laser beam in the main scanning direction.

In the flow chart, an appropriate pulse width is obtained from the power and diameter of the laser beam in the sub-scanning direction.

In the first place, as shown in FIGS. 4a and 4b, the diameter "dy" in the sub-scanning direction and power P are measured at "m" points (Step s1). This is followed by the step of referencing the combination of the diameter "dy" and power P of the laser beam having been used at the time of analysis in advance (Step s2). Then the corrected pulse widths for the combination closest to the measured value are collected (Step s3). After that, two-dimensional interpolation is applied to a desired image height and input density to ensure that the corrected pulse width can be returned, and one optical scanning apparatus is provided with the interpolated corrected pulse width (Step s4).

In addition to the advantage of greater importance being attached to the diameter of the laser beam in the sub-scanning direction, this technique for obtaining the correction data from the process has another advantage of measuring the physical quantity required to correct the pulse width, using a measuring instrument that can be used in the process, instead of using the sensor mounted on the optical scanning apparatus. This eliminates the need of providing the image forming apparatus with a sensor for detecting laser power or a sensor for detecting beam diameter. To be more specific, this arrangement provides advantages in both the measurement precision in measuring during the process, and costs. In the meantime, in the aforementioned Patent documents, a great number of high-volume production equipment must be equipped with sensors. If all the apparatuses to be shipped are to be equipped with sensors, measurement will have to be made at the sacrifice of detection precision and number. In addition, the sensor mounted inside the apparatus easily measures the beam diameter in the main scanning direction, but cannot easily detect the beam diameter in the sub-scanning direction. Such restrictions or difficulties are not found in the process. The beam diameter can be measured at a sufficiently great number of positions in both the main and sub-scanning directions.

Since working difficulties are involved in getting a great number of measuring points, it is possible to use a simple method wherein a small number of measuring points (five points in the Table) are printed on paper, as shown in Table 1. In this example, the diameter and power of the laser beam in the sub-scanning direction given in the Table is shown in terms of the relative value wherein the value at image height 0 is assumed as the reference value. A user or engineer enters the numerical value of this Table by operating the operation panel of the image forming apparatus. The storage section of the image forming apparatus contains all the results of analysis. The corrected pulse width for each image height is obtained by referencing the result of analysis for the combination closest to the combination of the inputted measured value. Then the two-dimensional interpolation as described above is performed, and the curved surfaces of the corrected pulse widths to be used for all the image heights are created. This data can be used when the image is outputted.

TABLE 1

|  | Image height (mm) | | | | |
| --- | --- | --- | --- | --- | --- |
|  | −150 | −100 | 0 | 100 | 150 |
| Laser beam diameter dy in the sub-scanning direction (reference ratio) | 1.15 | 1.05 | 1.00 | 1.11 | 1.12 |
| Power P (reference ratio) | 1.05 | 0.90 | 1.00 | 1.05 | 1.06 |

In the aforementioned steps, an appropriate pulse width has been obtained, based on a combination of the diameter of the laser beam in the sub-scanning direction and the output power of the laser beam. It is also possible to only consider the diameter of the laser beam in the sub-scanning direction. Further, both the diameter of the laser beam in the sub-scanning direction, and that in the main scanning direction can be taken into consideration. Still further, the output power of the laser beam can also be included in the aforementioned consideration. When the diameter "dx" in the main scanning direction is taken into account, finer corrections can be performed. In this case, the following steps can be taken:

In the first place, analysis is applied to a combination of diameters in the main and sub-scanning directions and power $(dx^{(i)}, dy^{(j)}, p^{(k)})$ (i, j, k=1, . . . , n), whereby $n^3$ gray levels are defined. The corrected pulse width $f_{ijk}$ is prepared. In the process, beam diameters (in the sub- and main scanning directions) and power are measured along the image height. The combination closest to the combination between the beam diameter and power used in the analysis is found out of the combinations of the measured beam diameter and power. The corrected pulse width in this case is referenced for use. To be more specific, "m" functions $f_{ijk}$ closest to the measured result are referenced, and two-dimensional interpolation is applied to obtain a curved surface for correction.

Figure 6:
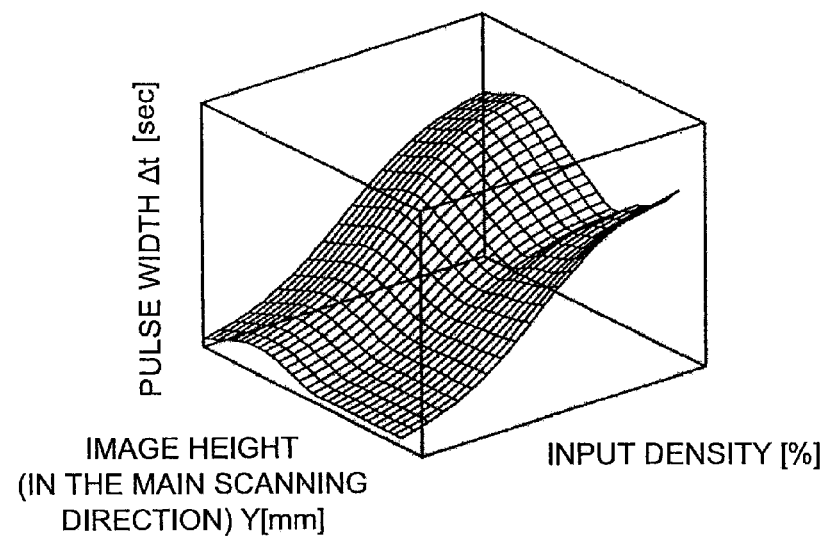
FIG. 6 is a diagram showing the correction information represented in the form of a curved surface by two-dimensional interpolation.

When correcting the pulse width, the temperature and humidity inside the image forming apparatus can be taken into account. The above description discusses the pulse width correction method wherein a normal temperature and humidity are assumed. However, if the fluctuation in the diameter of the laser beam resulting from temperature and humidity cannot be ignored, it is necessary to adjust the corrected pulse width as shown in FIG. 6.

One of the possible methods is to conduct a preliminary test to estimate the impact of temperature and humidity upon the beam diameter, and fine adjustment of the corrected pulse width is made in conformity to the environment wherein the image forming apparatus is exposed. The temperature and/or humidity inside the image forming apparatus is measured by a sensor, and the aforementioned correction is performed with consideration given to the measurement results. A conventional sensor can be used to measure the temperature and humidity. It should be noted, however, that the present invention is not restricted thereto.

(Embodiment 2)

Figure 8:
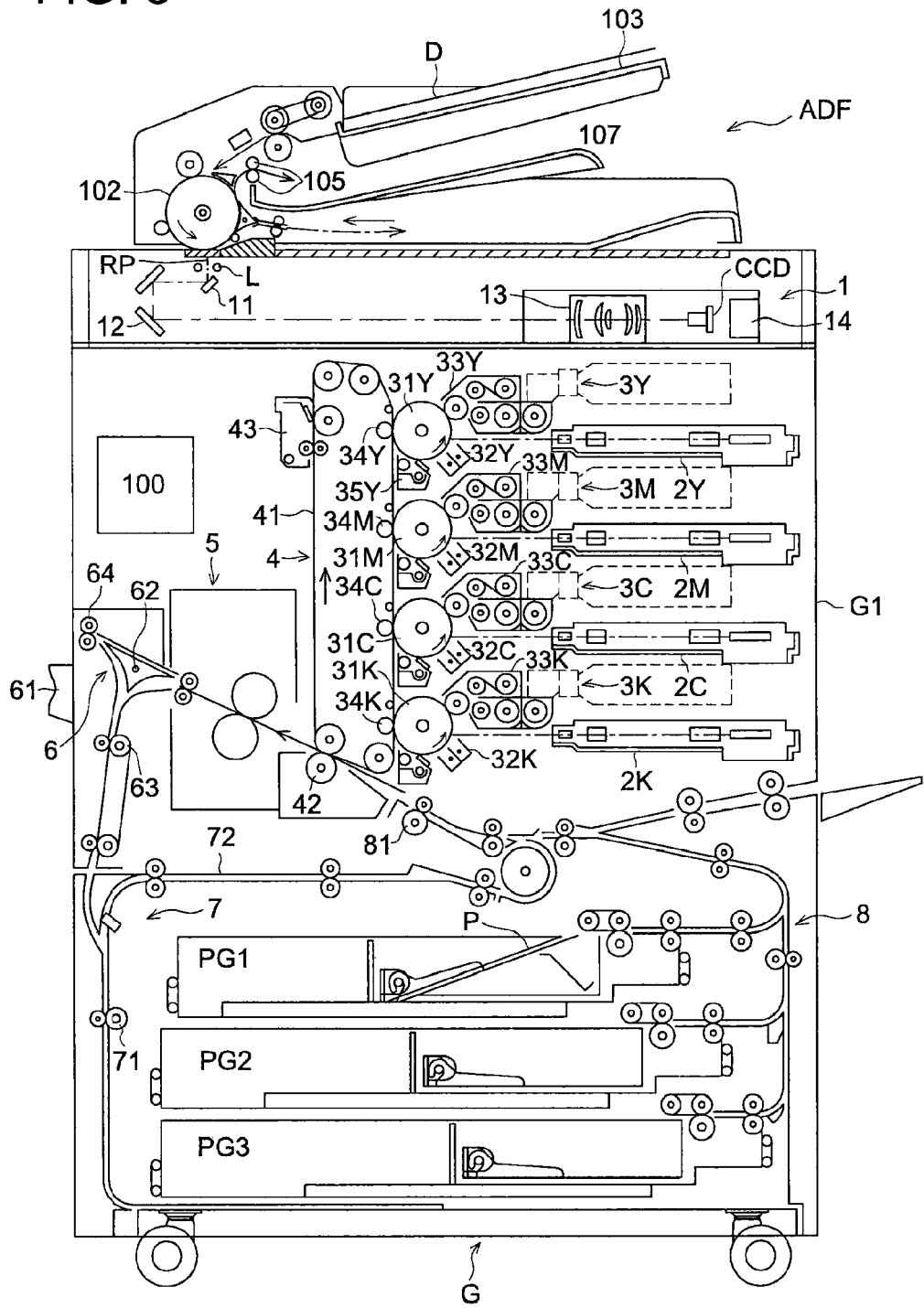
FIG. 8 is a schematic view representing the image forming apparatus of the present invention.
Figure 9:
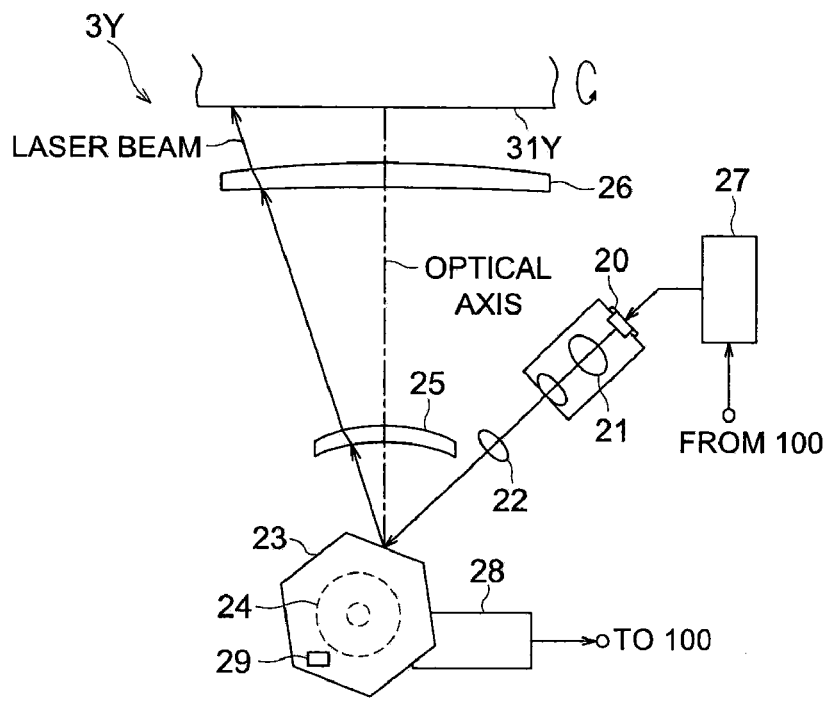
FIG. 9 is a schematic view representing the optical scanning apparatus as an embodiment of the present invention, the optical scanning apparatus being mounted on the image forming apparatus.

Referring to FIGS. 8 and 9, the following describes the image forming apparatus equipped with this optical scanning apparatus, as an embodiment of the present invention.

FIG. 8 is an overall view representing the mechanical structure of the color image forming apparatus. FIG. 9 is a partially enlarged view of the color image forming apparatus showing the optical scanning apparatus and writing unit.

The color image forming apparatus rotates the polygon mirror for each color and applies the laser beam of each color to the photoreceptor drum of each color to perform the scanning operation, whereby processing of the image is performed on this photoreceptor drum. The toner images of various colors having been formed by the photoreceptor drum are superimposed on one another on an intermediate transfer belt, whereby a color image is formed.

In the color image forming apparatus G illustrated in the diagram, a plurality of photoreceptors 31Y, 31M, 31C and 31K are arranged in a single file face to face with one intermediate transfer belt 41, whereby a full-color image is formed. This color image forming apparatus has an automatic document feed apparatus (ADF) on the top thereof.

The documents D placed on the document placement table 103 of the automatic document feed apparatus (ADF) are separated from one another and are fed to the document conveyance path. These documents are then conveyed by a conveyance drum 102. The image of the document D being conveyed is read by a document reading section 1 at the image document image reading position RP. The documents D having been read are ejected into a document ejection tray 107 by a document ejection roller 105.

The image forming apparatus includes the document reading section 1, exposure sections 2Y, 2M, 2C and 2K, image forming sections 3Y, 3M, 3C and 3K, intermediate transfer section 4, fixing section 5, reversal ejection section 6, sheet re-feed section 7, sheet feed section 8, and control section 100, which are placed in an enclosure (an image forming apparatus main unit G1).

The document reading section 1 allows the document image to be irradiated with a lamp L at the document reading position RP, and the reflected light thereof is led by the first mirror unit 11, second mirror unit 12, and lens 13 so that an image is formed on the light receiving surface of the image pickup element CCD.

The image data having been subjected to photoelectric conversion by an image pickup element CCD is subjected to A/D conversion, shading correction, compression and other processing by means of an image reading control section 14, and is stored as image data in the storage section 101 (FIG. 9) equipped with a RAM.

The image data stored in the storage section 101 is subjected to appropriate image processing under the conditions preset by the user, whereby output image data is generated.

Exposure sections 2Y, 2M, 2C and 2K include a laser beam source, polygon mirror and a plurality of lenses, and are used to generate a laser beam.

Of the exposure sections 2Y, 2M, 2C and 2K, the exposure section 2Y will be described in detail with reference to FIG. 9.

FIG. 9 is a conceptual diagram representing an example of the structure of the exposure section 2Y for the Y-color. The exposure section 2Y includes a semiconductor laser beam source 20, collimating lens 21, cylindrical lens 22, polygon mirror 23, polygon mirror motor 24, fθ lens 25, cylindrical lens 26 for image formation on the photoreceptor, LD drive section 27 and temperature and humidity sensor 28. The optical scanning apparatus for the Y-color is made up of the aforementioned collimating lens 21, cylindrical lens 22, polygon mirror 23, polygon mirror motor 24, fθ lens 25, cylindrical lens 26 for image formation on the drum surface and others. Further, the optical scanning apparatus is provided with the optical scanning apparatus storage section 29 that stores the data on the appropriate pulse width to ensure that the image output density is uniform with respect to one and the same input density, using the combination of the image height in the main scanning direction and input density in the image data, for this inherent optical scanning apparatus.

This data has been obtained according to the following procedure in the step of allowing the optical scanning apparatus to be supplied in advance, as shown in FIGS. 4a and 4b. Namely, in this step, the diameter and power of the beam in the sub-scanning direction is measured only at "m" points along the image height. This allows "m" functions to be prepared for all the image heights, and provides information on how to correct the pulse width for each image height. This data is given as the data showing the curved surface in FIG. 6. This data showing the curved surface allows the pulse width to be used for a desired image height and input density can be calculated on a continuous basis. When the aforementioned optical scanning apparatus is mounted on the image forming apparatus main unit, the data on the appropriate pulse width of the optical scanning apparatus storage section 29 is automatically read by the control section 100, and is readably stored in the storage section 101. It should be noted that the other exposure sections 2M, 2C, and 2K also have the same structure. When each optical scanning apparatus is mounted on the image forming apparatus main unit, the data on the appropriate pulse width for each color is automatically read by the control section 100 and is stored in the storage section 101.

The semiconductor laser beam source 20 is connected with the LD drive section 27 for the Y-color. The LD drive section 27 is supplied with a modulated signal according to the image data through the control section 100. In the control section 100, the data on the appropriate pulse width stored in the storage section 101 is read out according to the input density in image height and image data, whereby the signal modulated by the aforementioned pulse width is generated according to this data. The LD drive section 27 ensures that the laser drive signal of a predetermined pulse width having been modulated is outputted to the semiconductor laser beam source 20. The semiconductor laser beam source 20 permits a laser beam to be outputted in conformity to the laser drive signal for the Y-color. The laser beam coming out of the semiconductor laser beam source 20 is reshaped into a predetermined laser beam by a collimating lens 21 and cylindrical lens 2. This laser beam is deflected in the main scanning direction by the polygon mirror 23. The polygon mirror 23 is driven and rotated by the polygon mirror motor 24. The operation of the polygon mirror motor 24 is restricted by the aforementioned control section 100. The polygon mirror 23 is equipped with a temperature and humidity sensor 28, and the temperature and humidity data is outputted to the control section 100. A thermistor or similar device can be used as the temperature and humidity sensor 28, without the present invention being restricted by any particular structure.

The laser beam deflected by the polygon mirror 23 permits an image to be formed on the photoreceptor drum 31Y by the fθ lens 25 and cylindrical lens 26. This operation allows an electrostatic latent image of the document to be formed on the image area of the photoreceptor drum 31Y. In a similar manner, the photoreceptors 31M, 31C and 31K ensure that a latent image is formed by the exposure sections 2M, 2C, and 2K.

The image forming section 3Y includes the photoreceptor 31Y, main charging section 32Y arranged in the periphery thereof, development section 33Y, first transfer roller 34Y, and cleaning section 35Y. The above description also applies to the photoreceptors 31M, 31C and 31K.

The latent images on the photoreceptors 31Y, 31M, 31C and 31K are developed by the corresponding development Sections 33Y, 33M, 33C and 33K, and a toner image is formed on each of the photoreceptors.

The aforementioned toner images formed on photoreceptors 31Y, 31M, 31C and 31K are sequentially transferred onto predetermined positions of the intermediate transfer belt Al as a intermediate transfer member by the first transfer rollers 34Y, 34M, 34C and 34K of the intermediate transfer section 4.

The remaining toner is removed by the cleaning sections 35Y, 35M, 35C and 35K from the surfaces of the photoreceptors with the toner images having been transferred thereon.

In the meantime, the toner image transferred onto the intermediate transfer belt 41 is conveyed from the trays PG1, PG2 and PG3 of the sheet feed section 8 by the secondary transfer roller 42, and is transferred onto the sheet P having been fed out at a predetermined time interval by the sheet feed roller 81.

The belt cleaning section 43 cleans the surface of the intermediate transfer belt 41 with the toner image having been transferred to the sheet P, and is used for the next image transfer.

In the meantime, the sheet P carrying the toner image is fed to the fixing section 5, and pressure and heat are applied to the sheet P, whereby the toner image is fixed onto the sheet P.

The sheet P having been subjected to the fixing operation by the fixing section 5 is conveyed by the ejection reversal section 6, and is ejected to the ejection tray 61. When the sheet P is to be reversed and ejected, the sheet P is once fed downward by the ejection guide 62, and the trailing end of the sheet P is sandwiched by the ejection reversal roller 63. After that, the sheet is reversed and conveyed to the ejection roller 64, and is then ejected by the ejection guide 62.

When an image is to be formed on the back of the sheet P as well, the sheet P on whose surface toner image has been fixed is fed to the sheet re-feed section 7 located below, by the ejection guide 62. After the trailing end of the sheet is sandwiched by the paper re-feed reversal roller 71, the sheet P is fed backward so that the sheet P is reversed. The sheet P is then fed to the re-fed paper conveyance path 72, and an image is formed on the back of the sheet P.

Figure 10:
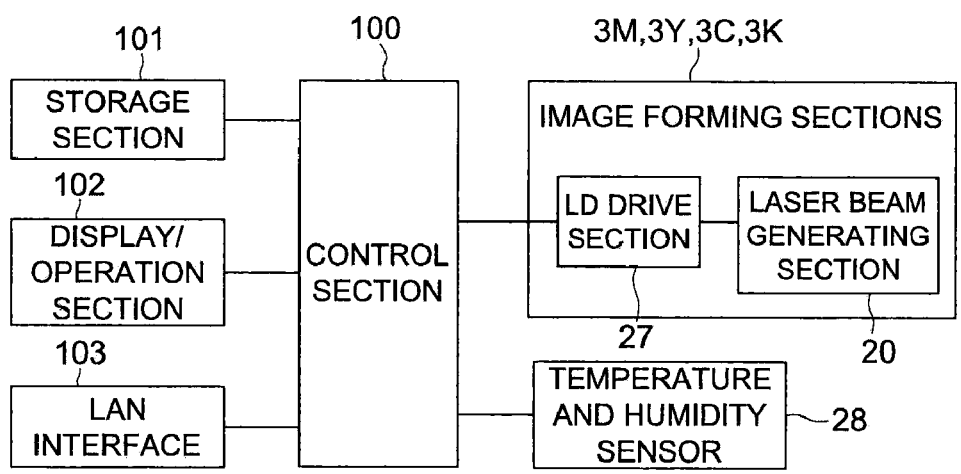
FIG. 10 is a control block diagram representing the image forming apparatus.

FIG. 10 is a block diagram showing an example of the structure of the control system of the image forming apparatus.

The control system of the image forming apparatus shown in FIG. 10 includes a control section 100, storage section 101, operation/display section 102, LD drive section (only 27 is illustrated), temperature and humidity sensor (only 28 is illustrated), and LAN interface 103.

The control section 100 is mainly made of a CPU and a program for running this CPU, and controls all the operations of the image forming apparatus. The storage section 101 is equipped with a flash memory for storing the data as nonvolatile memory, as well as a hard disk. It also includes a RAM that provides a work area for executing the image data and program.

Further, the control section 100 is connected with the operation/display section 102. The control section 100 allows the data operation to be inputted when the user specifies the image forming conditions such as selection of paper or setting of the sheet feed tray at the time of forming an image. Further, the control section 100 permits the aforementioned appropriate pulse width to be inputted, and allows the necessary information to be displayed. The operation/display section 102 can be made of a touch panel that permits both the operation and display to be performed integrally. However, the operation/display section 102 can also be made of an operation part and a display part as two separate structures independent of each other.

The control section 100 contains the detection data obtained by the temperature and humidity sensor (only 28 is illustrated) which is used to detect the temperature and humidity close to the polygon mirror for the exposure sections 2Y, 2M, 2C and 2K. The control section 100 provides desired control based on this detection data.

Further, the control section 100 is connected with the LA interface 103, and permits communication with an external apparatus via the LAN (not illustrated).

At the time of image formation, the control section 100 generates the pulse width modulated signal wherein the pulse width is basically modulated for each color, in conformity to the image data containing the density information stored in the storage section 101. Then the drive signal in conformity to this modulated signal is supplied to the laser beam generating section from the LD drive section for each color, whereby the laser beam of each color is generated. In this case, in conformity to the image data, the control section 100 reads from the storage section 101 the data on the appropriate pulse width with respect to input density along the image height in the main scanning direction. The control section 100 allows the pulse width to be corrected to have the appropriate pulse width, whereby the aforementioned pulse width modulated signal is generated. This procedure ensures that one and the same image output density is obtained for one and the same input density, independently of the image height. This signifies a substantial reduction in the irregularity in density in the output image.

When the aforementioned appropriate pulse width is to be determined in advance, it is possible to use the temperature and humidity inside the image forming apparatus added to the factor mainly consisting of the diameter of the laser beam in the sub-scanning direction. In this case, in the step of generating the data on appropriate pulse width in advance, analysis is performed with consideration given to temperature and humidity, in addition to the diameter of the laser beam in the sub-scanning direction. In the step of image formation, the aforementioned appropriate pulse width is read out of the storage section 101 in conformity to the detection data obtained by the aforementioned temperature and humidity sensor in addition to the image height and input density of the image data in the main scanning direction, whereby a pulse width modulated signal is generated.

Figure 11:
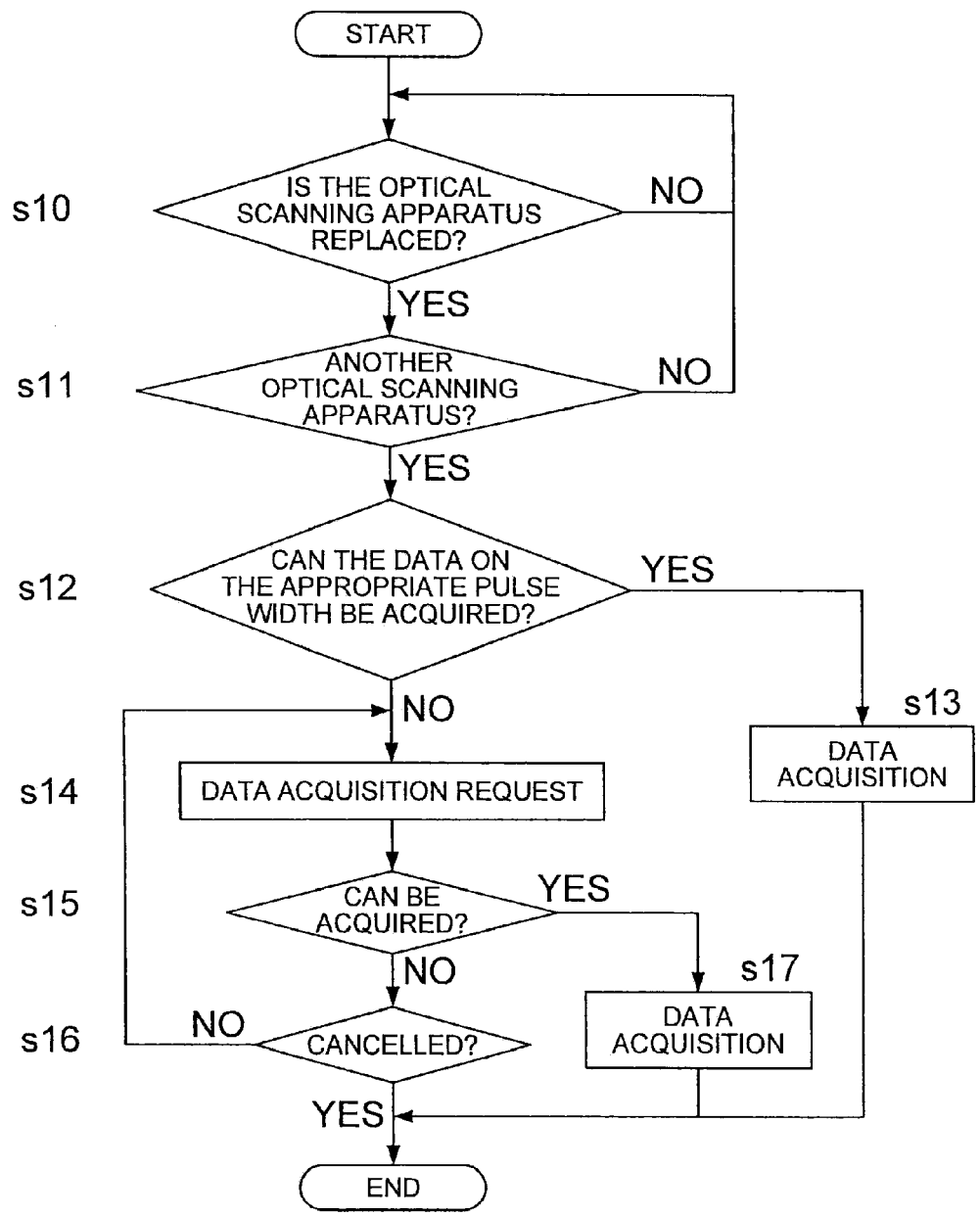
FIG. 11 is a flow chart showing the procedure of getting the data when the optical scanning apparatus is to be replaced.

The aforementioned optical scanning apparatus is detachably mounted on the image forming apparatus main unit G1. In the event of chronological deterioration or trouble, the optical scanning apparatus can be replaced by another separate optical scanning apparatus. This separate optical scanning apparatus is also equipped with the optical scanning apparatus storage section 29. When this optical scanning apparatus storage section 29 stores the data on the aforementioned appropriate pulse width inherent to this separate optical scanning apparatus, the control section 100 can automatically acquire the data. If the data cannot be acquired, the control section 100 can request acquisition of this data. Referring to the flow chart in FIG. 11, the following describes this procedure.

In the first place, a decision step is taken to determine whether or not the optical scanning apparatus has been replaced (Step s10). The processing continues until the optical scanning apparatus is replaced. When the optical scanning apparatus has been replaced (YES in Step s10), a decision step is taken to determine whether or not the replacement is a separate device (Step s11). If the replacement is not a separate device (NO in Step s11), control goes back to Step s10, wherein the aforementioned decision step is repeated. If the optical scanning apparatus has been replaced by a separate device (YES in Step s11), a decision step is taken to determine whether or not the data on the appropriate pulse width of a new optical scanning apparatus can be acquired. The method of acquiring this data can be preset in the storage section 101. When the control section 100 has detected replacement with a new optical scanning apparatus, the data is automatically acquired in conformity to this acquisition method, and is stored in the storage section 101 (Step s13). For example, it is possible to arrange the following method: Setting is made in such a way that the data is acquired from the optical scanning apparatus storage section mounted on the optical scanning apparatus. Further, the individual number of the optical scanning apparatus is acquired by the control section. This individual number is notified to the LAN interface 103 or the management server connected to the LAN via the LAN, and a request-to-send signal is supplied thereto. This procedure ensures that the data of the optical scanning apparatus of the relevant individual number is automatically acquired from the management server.

If the data cannot be acquired by the preset acquisition method (NO in step s12), a data acquisition request display is given on the operation/display section 102 (Step s14). In response to the request, the operator inputs this data through the operation/display section 102, or the sheet printed with the information on this data is read by the document reading section, whereby the data can be acquired (YES in Step s15). The control section 100 acquires the data into the storage section 101 in the same manner as the above (Step s16). In the meantime, if the operator does not select the acquisition of the data when the optical scanning apparatus has been replaced, the acquisition of new data can be suspended by pressing the Cancel button displayed on the operation/display section 102 (YES in Step s16). In this case, an image can be formed without correcting the pulse width in response to the input image along the image height.

EXAMPLE 1

The following describes the Example for verifying the advantages of the present invention.

The aforementioned method according to the invention of the present application ensures that:
the gray level can be brought to the ideal level despite fluctuations in the beam diameter or power; and
If the gray level is adjusted to one target at each of the image heights, irregularity in density can be reduced in the main scanning direction. These advantages of the present invention have been verified by analysis. Gray level D and color difference $\Delta E_{oo}$ are used as indicators for evaluating the irregularity in density. Further, the following Comparative Examples have been evaluated in contrast to the invention of the present application—Comparative Example wherein the pulse width is not corrected; Comparative Example wherein the pulse width is corrected according to the diameter of the laser beam in the main scanning direction alone; Comparative Example wherein the pulse width is corrected according to the power of the laser beam alone; and Comparative Example wherein the pulse width is corrected according to both the diameter of the laser beam in the main scanning direction and the power of the laser beam.

The density D was measured when the image of the gray level subjected to screening was outputted from the image forming apparatus. The results of this measurement are given in FIGS. 12 and 13. In the measurement results for cyan, errors are added to the standard values of the diameter and power in the main and sub-scanning directions. The difference is found in the presence or absence of correction, or the method of correction.

Figure 12:
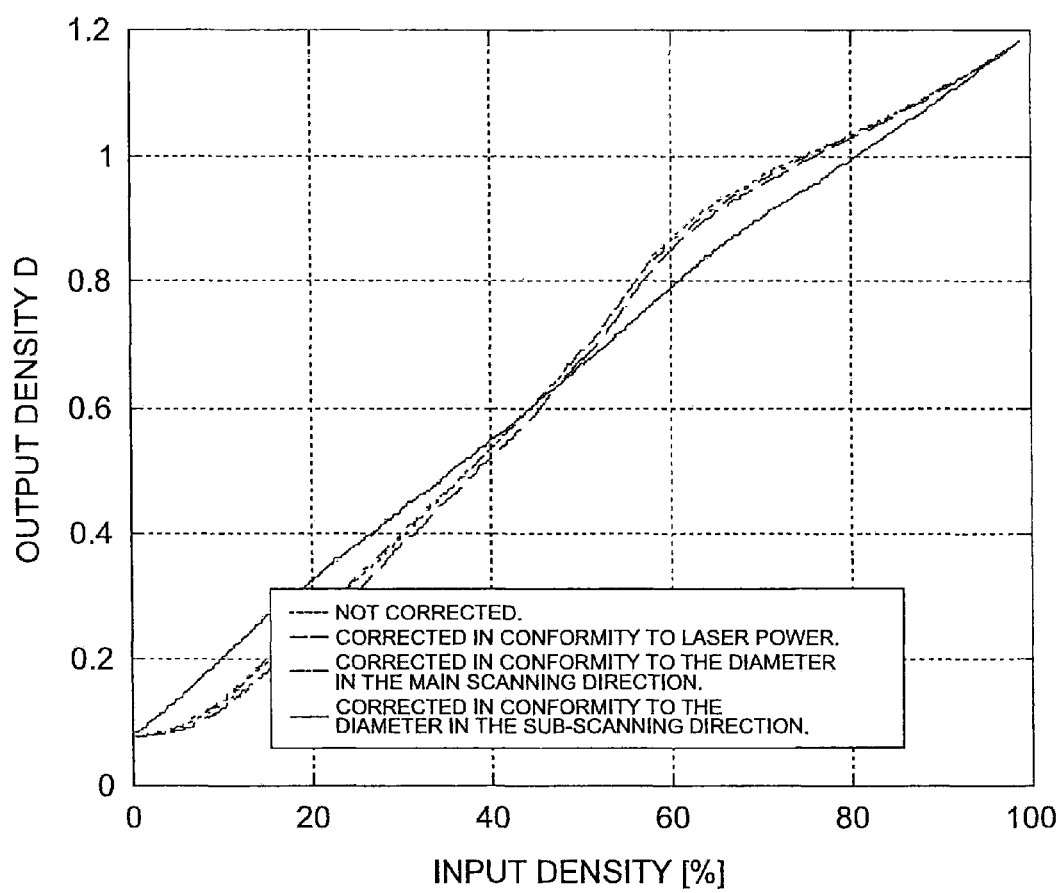
FIG. 12 is a diagram showing the relationship between the input density and output density in various forms of correction made in an embodiment of the present invention.

FIG. 12 shows the results of evaluation in the case wherein no correction was made, and the cases wherein corrections were made according to any one of the following three factors—the diameter in the main scanning direction, the diameter in the sub-scanning direction, and the power of the laser beam.

The dotted line indicates the result when the pulse width was not corrected. The output density fails to maintain the linearity with respect to the input. Even when the pulse width is corrected based on the diameter and power of the laser beam in the main scanning direction alone, there is a great deal of impact given by the other errors—the diameter errors in the sub-scanning direction and power. As indicated by the broken line and one-dot chain line, there is almost no improvement in gray level, as compared to the case wherein no correction was made.

By contrast, only when a correction was made with consideration given to the diameter in the sub-scanning direction, the gray level can be improved (solid line).

Figure 13:
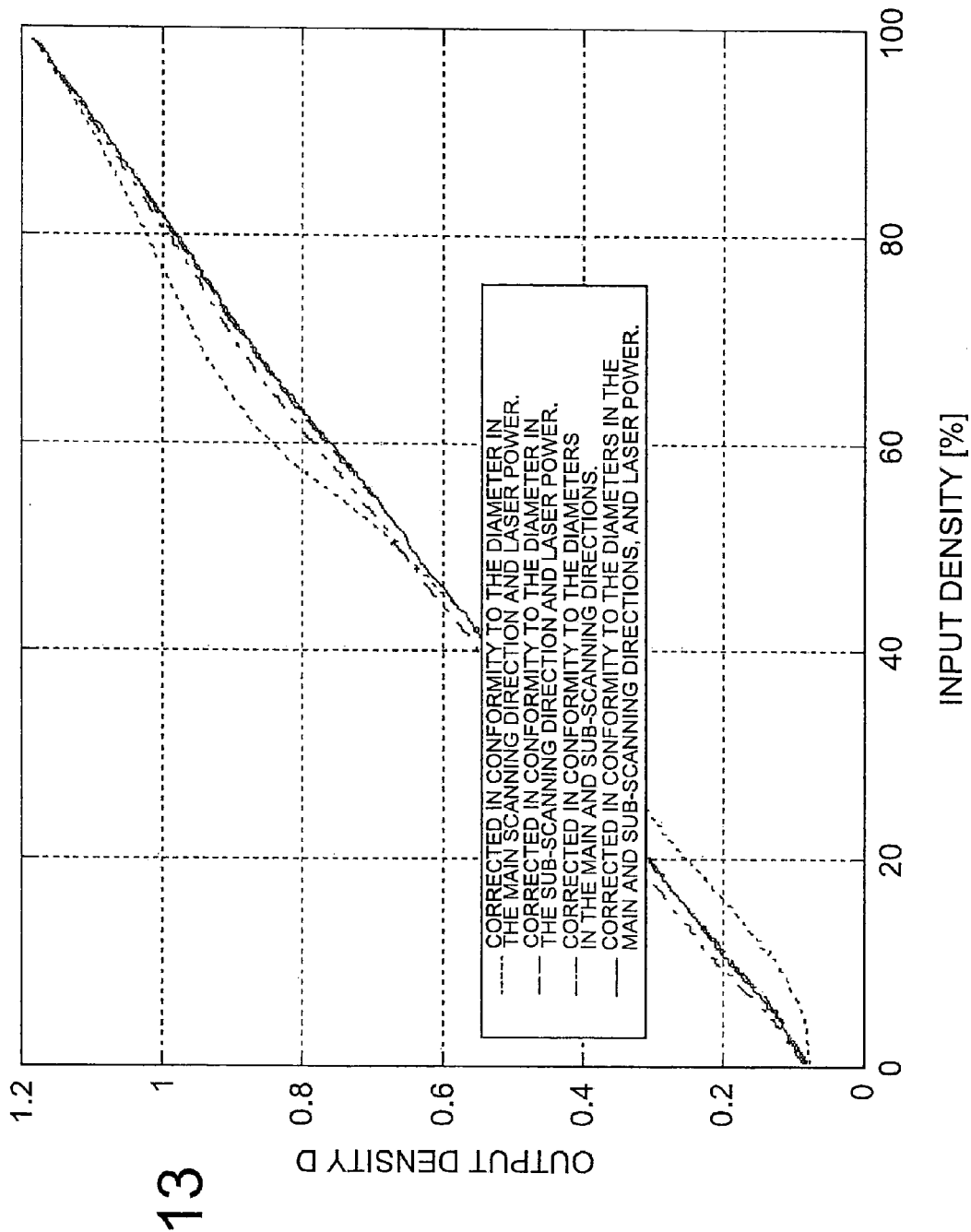
FIG. 13 is a diagram showing the relationship between the input density and output density in various forms of correction.

FIG. 13 shows the correction results made by a combination of the diameter in the main scanning direction, the diameter in the sub-scanning direction and laser power.

If the pulse width is corrected by a combination of the diameter in the main scanning direction and laser power, the output density fails to maintain the linearity with respect to the input and there is almost no improvement in the gray level.

By contrast, it can be seen that, when two or more of the beam diameters in the sub-scanning direction, the beam diameter in the main scanning direction and laser power are combined, there is much improvement in the gray level (broken line or one-dot chain line). In this Example, greater improvement was observed when the beam diameter in the sub-scanning direction and laser power were combined. Further, the greatest improvement was observed in the combination of all of the diameters in the sub-scanning direction, the diameter in the main scanning direction, and laser power (as denoted by the solid line).

The aforementioned description of the advantages of the present invention method is also applicable to the case of magenta, yellow and black.

The gray level can be adjusted without having recourse to the image height. This reduces the irregularity in density in the main scanning direction. For the aforementioned case, the difference in output density with respect to each input density—irregularity in density—at two points having different positions in the same main scanning direction is shown as CIEDE2000 color difference $\Delta E_{00}$ in FIGS. 14 and 15. One of the colors at two points in the sense in which it is used here refers to the color represented based on the standard beam diameter in the main and sub-scanning directions and the laser power, while the other of these colors refers to the color represented after having been corrected, although errors are attached thereto. Although the input density is the same, the irregularity in density between two points caused by the fluctuation in beam diameter and power is obtained over the entire area of the input density. All the colors at the aforementioned two points are formed by superimposition of three colors—cyan, magenta and yellow.

FIG. 14 shows the results in the case wherein no correction was made, and the case wherein correction was made according to any one of the following three factors—the diameter in the main scanning direction, the diameter in the sub-scanning direction, and the power of the laser beam.

As in the case of the gray level, there is no reduction in color difference if only the diameter in the main scanning direction or laser power is reflected in the correction of the pulse width. However, if the pulse width is corrected with consideration given to the diameter in the sub-scanning direction, the color difference is reduced by a maximum of about (9.18−2.91)=6.27, as can be seen from the diagram.

FIG. 15 shows the results of correction made by a combination of the diameter in the main scanning direction, the diameter in the sub-scanning direction and the laser power.

There is almost no improvement in the color difference when the pulse width is corrected by a combination of the diameter in the main scanning direction and laser power.

By contrast, the color difference is greatly reduced by a combination of two or more of the diameter in the sub-scanning direction, the diameter in the main scanning direction and laser power, as can be seen from the diagram (broken line or one-dot chain line). In this diagram, a greater improvement is achieved by a combination of the diameter in the sub-scanning direction and laser power. Further, the greatest improvement is achieved with the combination of all three of the diameter in the sub-scanning direction, the diameter in the main scanning direction and laser power (solid line).

The above description has discussed the aforementioned embodiments and examples of the present invention, without the present invention being restricted thereto. It goes without saying that the present invention can be embodied in a great number of variations with appropriate modification or additions, without departing from the technological spirit and scope of the invention claimed.

As described above, according to the image forming method of the present embodiment, the pulse width modulated signal having the pulse width modulated based on the image data containing the density information is inputted into the laser beam output section, and a laser beam is outputted. This laser beam is applied onto the surface of the photoreceptor to perform scanning operations by means of the optical scanning apparatus, whereby an image is outputted. This image forming method detects the diameter of the laser beam in the sub-scanning direction formed on the surface of the photoreceptor, wherein the diameter of this laser beam is inherent to each optical scanning apparatus and changes along the image height in the main scanning direction. In response to the diameter in the sub-scanning direction, the pulse width is corrected in such a way that the image output density will be uniform with respect to the same input density of the aforementioned image data. This arrangement provides one and the same output image for one and the same input density, independently of the image height in the main scanning direction, and reduces irregularities in density.

Further, according to the optical scanning apparatus of the present embodiment, the laser beam coming out of the laser beam output section is applied to the photoreceptor surface to perform scanning operations, by the pulse width modulated signal having the pulse width modified based on the image data including the density information. This optical scanning apparatus is mounted detachably on the image forming apparatus main unit, and includes an optical scanning apparatus storage section that stores in advance the data on the appropriate pulse width determined to ensure that the image output density will be uniform with respect to one and the same input density, in conformity to the combination of the image height in the main scanning direction and the input density in the image data. This arrangement ensures each optical scanning apparatus to acquire the data on the appropriate pulse width easily and reliably, and reduces the irregularity in density in image formation based on this data.

Further, according to the image forming apparatus of the present embodiment, an image can be formed by outputting the laser beam having an appropriate pulse width using the data on the appropriate pulse width inherent to the optical scanning apparatus mounted on the image forming apparatus, and easy and reliable reductions in irregularity in density are achieved in image formation, because this image forming apparatus includes:

a laser beam output section for outputting a laser beam according to the pulse width modulated signal having the pulse width modulated based on the image data containing the density information;

a photoreceptor exposed to the aforementioned laser beam;

an optical scanning apparatus wherein the laser beam outputted from the laser beam output section is applied to the surface of the photoreceptor to perform scanning operations;

a storage section that stores the data on appropriate pulse width to determine that image output density will be uniform for one and the same density by a combination of the image height in the main scanning direction and the input density in the image data in the aforementioned optical scanning apparatus; and a control section that provides control in such a way that, at the time of image formation, the data on the image height in the main scanning direction and appropriate pulse width with respect to the input density in the image data is read from the storage section, and the aforementioned pulse width modulated signal is generated according to the data, whereby the laser beam is outputted from the laser beam output section.

The present invention can be used to correct for irregularity in density of a printing press, multi-functional peripheral, color printer, FAX and MFP as a multi-functional peripheral made up of a combination thereof, independently of whether these devices are color or monochromatic devices.

According to the image forming apparatus of the present embodiment, a pulse width modulated signal is generated in response to the image height and input density in conformity to the data on the appropriate corrected pulse width stored in the storage section at the time of image formation, and an image is formed at a predetermined image output for the same input density.

In the optical scanning apparatus mounted on the image forming apparatus, a resin-made lens can be used as an optical member, for example, a cylindrical lens or fθ lens. The low-cost advantage of the resin-made lens is gained at the sacrifice of molding precision. Thus, the adverse effect on the irregularity in density resulting from molding precision has to be accepted in the conventional art. However, the invention of the present application ensures that correction of the pulse width makes up for the defect of lower precision without sacrificing the low cost advantage, whereby reductions in the irregularity in density can be achieved. Accordingly, especially when at least one resin-made lens is contained in the aforementioned optical scanning apparatus, the present embodiment ensures compatibility between low costs and high precision—a greater advantage of the present embodiment.

According to the image forming method of the present embodiments, particular attention is given to the diameter of a laser beam in the sub-scanning direction which exhibits a comparatively great fluctuation wherein this laser beam is used for scanning operations at the time of image formation, and the pulse width of the laser beam is corrected according to the fluctuation in this diameter. This arrangement provides a reliable and easy way of ensuring that the image output density will be uniform for one and the same input density.

The aforementioned fluctuation in the diameter in the sub-scanning direction differs according to each optical scanning apparatus. As shown in the diagram, a change of the image height Y in the main scanning direction is represented as the fluctuation "dy" of the diameter in the sub-scanning direction. In this way, if there is a fluctuation in the diameter in the sub-scanning direction along the image height, the density of image output is changed according to the difference in image height, although the input density is the same.

In the present embodiments, the fluctuation in density in response to the fluctuation in the diameter in the sub-scanning direction is identified and the fluctuation in density is eliminated, whereby the pulse width is corrected. This procedure ensures that the image output density is kept uniform for the same input density. The fluctuation in density in response to the fluctuation in the diameter in the sub-scanning direction can be acquired in advance as actual data. Further, the relationship between the diameter in the sub-scanning direction and density can be obtained by simulation. The relationship between the change in pulse width and the fluctuation in density can also be obtained in advance as actual data. The relationship between the two can be obtained by simulation.

For example, the aforementioned relationship can be derived by using the analysis program for predicting the gray level. In this analysis program, if a step is taken to input the values for the diameter of the laser beam and the beam power together with the gray scale image, it is possible to output an image that would be written out if the parameter has been produced on the actual equipment. When the image has been inputted, the density of each pixel is converted into the pulse width linearly. This can be used for analysis.

Figure 2A:
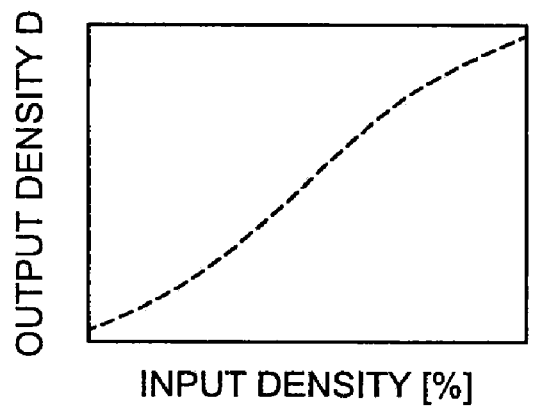
FIGS. 2a, 2b and 2c are chart representing the relationship between the input density and output density in a combination of laser beam diameter and output power at the time of image formation, the relationship between the input density and pulse width, and the relationship between the input density and output density at the time of correcting the pulse width.
Figure 2B:
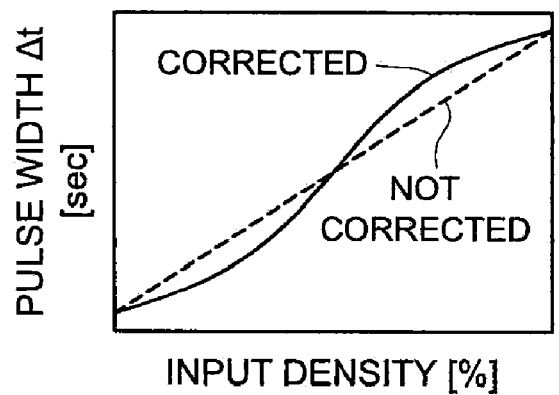
Figure 2C:
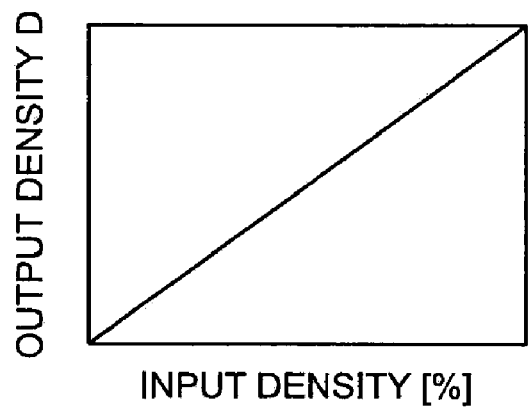

FIG. 2a is a diagram representing the fluctuations of the gray level and density determined in the combination between the diameter of a laser beam in the sub-scanning direction and the output power of the laser beam. The outputted image is measured by the aforementioned program itself. The data on gray level can be obtained as the fluctuation in the density D with respect to the input density. This fluctuation in density is not ideal because the fluctuation in output density is not proportional to the fluctuation in input density. If the diameter in the sub-scanning direction and power are different, a different fluctuation is exhibited. When the pulse width is modulated based on the image data including the density information, the combination of the diameter and output power is usually not taken into account. Accordingly, the relationship between the input density and pulse width is determined in the form dissociated from the fluctuation in density, without following the fluctuation shown in FIG. 2a, as shown by the dotted line (without correction) of FIG. 2b. This results in poor correlation between the input density and output density, with the result that an irregularity in density is produced. By contrast, if the pulse width is corrected with consideration given to the fluctuation in output density relative to the fluctuation in input density (as shown by the solid line of FIG. 2b), the correlation of the output density relative to the input density is improved, as shown in FIG. 2c, with the result that irregularities in density can be reduced. This correction is performed according to the combination between the diameter in the sub-scanning direction and the output power of the laser beam. Then the uniform image output density can be achieved for one and the same input density.

If an attempt is made to correct the pulse width along the image height, the input density may include the input density Im % wherein the value is invariable as a result. This corresponds to the crossing point between the broken line and solid line in FIG. 2b. If the diameter of the laser beam in the sub-scanning direction changes, for example, as shown in FIG. 1, an image is inputted so that the input density is uniform along the image height, for example. Then how the pulse width is corrected along the image height to keep the output density uniform depends on whether the input density or input density "Im" is greater. If an image has been inputted wherein there are continued highlighted sections of a predetermined input density Ih % along the image height (Ih<Im), the corrected pulse width will generally be shown as a curve of downwardly convex form, as given in FIG. 3. This is because, if the beam diameter is reduced, the density will be higher than the ideal level in the highlighted section. Thus, the pulse width has to be reduced below the level prior to correction. Conversely, if an image has been inputted wherein there are continued high density portions of a predetermined input density Is % along the image height (Im<Is), the corrected pulse width will generally be shown as a curve of upwardly convex form, as given in FIG. 3. In the aforementioned method for correcting the appropriate pulse width, when the boundary is assumed as the input density "Im" wherein there is no change in the pulse width before and after correction, a fluctuation in the corrected power source (way of increasing and decreasing, or the direction of a convex) is reversed, in some cases, with respect to the input density lower than that level and the input density higher than that level, as described above.

Figure 3:
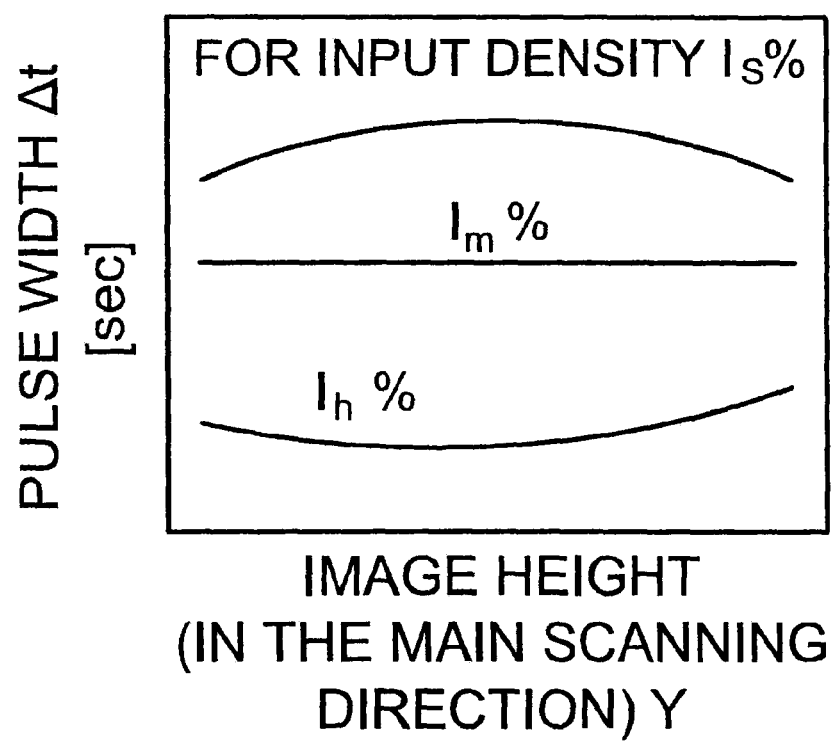
FIG. 3 is a chart representing the relationship between the image height and pulse width during the step of correcting the pulse width in response to the differences in input density at the time of image formation.

This can be verified by the following procedure: The images wherein there is a continued predetermined input density along the image height, for example, three images—25%, 50%, and 75% images—are created. Then a step is taken to output each of these images, and to examine whether or not the pulse width changing with the image height has been reversed in an image having a highlight of 25% and an image having a high density of 75%, as shown in FIG. 3.

According to the optical scanning apparatus of the present invention, the optical scanning apparatus storage section provides the data on appropriate pulse width, inherent to each optical scanning apparatus, with consideration given to at least the image height and the laser beam in the sub-scanning direction. The data on the appropriate pulse width can be the data on the pulse width itself or the data representing the amount of correction. Further, it can be the data on appropriate pulse width that is obtained in the final stage by calculation or other procedures according to this data.

The aforementioned optical scanning apparatus storage section can be either fixed to the optical scanning apparatus main unit or separated from the optical scanning apparatus main unit. There is no particular restriction to the structure of the optical scanning apparatus storage section. The only requirement is that data on the appropriate pulse width can be readably stored. Thus, a memory and hard disk can be used as the optical scanning apparatus storage section. Further, the optical scanning apparatus storage section can be the one printed on paper or the like. The optical scanning apparatus storage section printed on paper is exemplified by the one using the special-purpose image reading section provided on the image forming apparatus main unit and the image reading section for reading the document wherein information can be obtained by reading of the image.

It is preferred that the optical scanning apparatus recording section should be mounted on the optical scanning apparatus main unit. Preferably, when mounted on the image forming apparatus main unit, the data on appropriate pulse width is automatically read from the optical scanning apparatus recording section and can be used in the image forming apparatus.

The appropriate pulse width is inherent to each of the optical scanning apparatuses that can be mounted or dismounted from the main unit of the image forming apparatus, and is different according to how various factors are combined. Thus, when the optical scanning apparatus is replaced by another optical scanning apparatus, it is necessary to use the corrected pulse width inherent to the new optical scanning apparatus. In this case, new data on the corrected pulse width is automatically sent to the main unit of the image forming apparatus, without the user being required to perform the work other than replacement work. This arrangement ensures advantages in workability.

According to the image forming apparatus of the present embodiments, at the time of image formation, a pulse width modulated signal is generated in conformity to the image height and input density based on the data on appropriate corrected pulse width stored in the storage section, and an image is formed at a predetermined image output for the same input density.

In the optical scanning apparatus mounted on the image forming apparatus, a resin-made lens can be used as the optical member, for example, a cylindrical lens or fθ lens. Since the reduced cost of a resin-made lens is gained at the sacrifice of molding precision, the adverse effect of molding precision upon the irregularity in density has to be accepted in the conventional art. In the invention of the present application, however, the reduced level of precision is compensated for by a correction of the pulse width while the cost is maintained low. This ensures reductions in the irregularity in density. Thus, especially when at least one resin-made lens is contained in the aforementioned optical scanning apparatus, the image forming apparatus of the present embodiment provides a great advantage that ensures the compatibility of reduced cost and enhanced precision.

What is claimed is:

1. An image forming method comprising:
inputting a pulse width modulated signal into a laser beam output section for outputting a laser beam, wherein a pulse width of the pulse width modulated signal is changed based on image data containing density information;
scanning the laser beam onto a surface of a photoreceptor through an optical scanning apparatus for forming an image;
detecting a diameter of the laser beam in a sub-scanning direction formed on the surface of the photoreceptor, the diameter of the laser beam inherent to each optical scanning apparatus and changing along an image height in a main scanning direction; and
correcting the pulse width based on information on the image height in the main scanning direction so that the diameter in the sub-scanning direction along the main scanning direction is uniform with respect to one and the same input density in the image data.

2. The image forming method of claim 1 comprising:
detecting an output power of the laser beam; and
correcting the pulse width in response to a combination of the diameter in the sub-scanning direction and the output power so that the image output density is uniform with respect to one and the same input density in the image data.

3. The image forming method of claim 2 comprising:
detecting at least one of a temperature and a humidity inside of the image forming apparatus; and
correcting the pulse width in response to a combination of the diameter in the sub-scanning direction, the output power of the laser beam and at least one of the temperature and the humidity so that the image output density is uniform.

4. The image forming method of claim 1 comprising:
detecting a diameter of the laser beam in the main scanning direction formed on the surface of the photoreceptor, the diameter of the laser beam inherent to each optical scanning apparatus and changing along the image height in the main scanning direction; and
correcting the pulse width in response to a combination of the diameter in the sub-scanning direction and the diameter in the main scanning direction so that the image output density is uniform with respect to one and the same input density in the image data.

5. The image forming method of claim 4 comprising:
detecting an output power of the laser beam; and
correcting the pulse width in response to a combination of the diameter in the sub-scanning direction, the diameter in the main scanning direction and the output power so that the image output density is uniform with respect to one and the same input density in the image data.

6. The image forming method of claim 4 comprising:
detecting at least one of a temperature and a humidity inside of the image forming apparatus; and
correcting the pulse width in response to a combination of the diameter in the sub-scanning direction, the diameter in the main-scanning direction and at least one of the temperature and the humidity so that the image output density is uniform.

7. The image forming method of claim 4 comprising:
detecting at least one of a temperature and a humidity inside of the image forming apparatus; and correcting the pulse width in response to a combination of the diameter in the sub-scanning direction, the diameter in the main-scanning direction, the output power of the laser beam and at least one of the temperature and the humidity so that the image output density is uniform.

8. The image forming method of claim 1 comprising:

detecting at least one of a temperature and a humidity inside of the image forming apparatus; and correcting the pulse width in response to a combination of the diameter in the sub-scanning direction and at least one of the temperature and the humidity so that the image output density is uniform.

9. The image forming method of claim 1, wherein, when the pulse width is corrected, there is an input density having a constant image output density with not correcting the pulse width for a same input density, and pulse width changes by the correcting are reversed with each other in an input density higher than the input density having the constant output density and in an input density lower than the input density having the constant output density.

10. The image forming method of claim 1, wherein a correcting amount of the pulse width in response to the input density along the image height in the main scanning direction is obtained in advance for each optical scanning apparatus, and, when the image is formed, the pulse width is corrected in response to the correcting amount obtained based on the image height in the main scanning direction and the input density of the image data.

11. The image forming method of claim 1, wherein a correcting amount of the pulse width in response to the input density along the image height in the main scanning direction is obtained in advance for each optical scanning apparatus prior to be mounted on the image forming apparatus, and, when the image is formed after the each optical scanning apparatus is mounted on the image forming apparatus, the pulse width is corrected in response to the correcting amount obtained based on the image height in the main scanning direction and the input density of the image data.

12. The image forming method of claim 11, wherein, when the correcting amount of the pulse width is obtained, sensors are disposed along the main scanning direction at a position having the same distance as a distance from the optical scanning apparatus to the photoreceptor, at least the diameter of the laser beam in a sub-scanning direction reaching the sensor is detected by each of the sensors at each position corresponding to the image height in the main scanning direction.

* * * * *